(12) United States Patent
Stratton

(10) Patent No.: US 12,153,215 B2
(45) Date of Patent: Nov. 26, 2024

(54) COMPACT SEE-THROUGH HEAD UP DISPLAY

(71) Applicant: Rockwell Collins, Inc., Cedar Rapids, IA (US)

(72) Inventor: Eric P. Stratton, Portland, OR (US)

(73) Assignee: Rockwell Collins, Inc., Cedar Rapids, IA (US)

(*) Notice: Subject to any disclaimer, the term of this patent is extended or adjusted under 35 U.S.C. 154(b) by 408 days.

(21) Appl. No.: 17/178,481

(22) Filed: Feb. 18, 2021

(65) Prior Publication Data

US 2022/0260837 A1 Aug. 18, 2022

(51) Int. Cl.
*G02B 27/01* (2006.01)
*B64D 43/00* (2006.01)

(52) U.S. Cl.
CPC ......... *G02B 27/0172* (2013.01); *B64D 43/00* (2013.01); *G02B 27/0176* (2013.01); *G02B 2027/015* (2013.01); *G02B 2027/0196* (2013.01)

(58) Field of Classification Search
CPC ............ G02B 27/0172; G02B 27/0176; G02B 2027/015; G02B 2027/0196; G02B 2027/0185; G02B 27/0101; G02B 27/01; G02B 6/124; G02B 6/126; G02B 27/0103; G02B 27/0149; G02B 27/017; G02B 27/0179; G02B 27/0189; G02B 2027/0105; G02B 2027/0107; G02B 2027/0109; G02B 2027/011; G02B 2027/0112; G02B 2027/0114; G02B 2027/0116; G02B 2027/0118; G02B 2027/0121;

(Continued)

(56) References Cited

U.S. PATENT DOCUMENTS

| 10,197,810 B2 | 2/2019 | Seo et al. |
| 10,466,496 B2 | 11/2019 | Parsons |

(Continued)

FOREIGN PATENT DOCUMENTS

| EP | 3603058 A1 | 2/2020 |
| IL | 269386 A | 11/2019 |
| IN | 201947042578 A | 11/2019 |

OTHER PUBLICATIONS

Extended Search Report in European Application No. 22156819.9 dated Jul. 5, 2022, 10 pages.

(Continued)

*Primary Examiner* — Henry Duong
(74) *Attorney, Agent, or Firm* — Suiter Swantz IP

(57) ABSTRACT

A compact see-through head up display (HUD) for a vehicle such as an aircraft implemented as a fixed display positionable forward of a user (e.g., pilot), a head worn display, a helmet mounted display, etc. The HUD may be provided as an integrated stack including a see-through emissive display positioned between a predetermined number of first and second optical pairings each including a waveplate coupled with a polarization directed lens. The first optical pairing is configured to collimate display light emitted from a display side of the see-through emissive display and the second optical pairing provides an equal and opposite focal vergence effect to counter the focal vergence effect of the first optical pairing such that the see-through emissive display does not affect the focal distance of the outside environment as viewed through the see-through emissive display.

12 Claims, 6 Drawing Sheets

(58) Field of Classification Search
CPC ...... G02B 2027/012; G02B 2027/0123; G02B 2027/0125; G02B 2027/0127; G02B 2027/0129; G02B 2027/013; G02B 2027/0132; G02B 2027/0134; G02B 2027/0136; G02B 2027/0138; G02B 2027/014; G02B 2027/0141; G02B 2027/0143; G02B 2027/0145; G02B 2027/0147; G02B 2027/0152; G02B 2027/0154; G02B 2027/0156; G02B 2027/0158; G02B 2027/0159; G02B 2027/0161; G02B 2027/0163; G02B 2027/0165; G02B 2027/0167; G02B 2027/0169; G02B 2027/0174; G02B 2027/0178; G02B 2027/0181; G02B 2027/0183; G02B 2027/0187; G02B 2027/019; G02B 2027/0192; G02B 2027/0194; G02B 2027/0198; B64D 43/00
USPC ........................................................ 359/630
See application file for complete search history.

(56) References Cited

U.S. PATENT DOCUMENTS

| | | | |
|---|---|---|---|
| 10,718,947 | B1 | 7/2020 | Lam |
| 10,768,371 | B1 | 9/2020 | Wheelwright et al. |
| 2015/0362734 | A1* | 12/2015 | Moser .................. G03H 1/041 359/13 |
| 2016/0097930 | A1 | 4/2016 | Robbins et al. |
| 2019/0107719 | A1* | 4/2019 | Edwin .................. G09G 3/003 |
| 2019/0285890 | A1 | 9/2019 | Lam et al. |
| 2019/0285891 | A1 | 9/2019 | Lam et al. |
| 2020/0249480 | A1 | 8/2020 | Martinez et al. |

OTHER PUBLICATIONS

European Communication pursuant to Article 94(3) EPC dated May 2, 2024; European Application No. 22156819.9.

* cited by examiner

COMPACT SEE-THROUGH HEAD UP DISPLAY

TECHNICAL FIELD

The subject matter disclosed herein relates generally to head up displays (HUDs), and more particularly to a compact see-through HUD configured as an integrated stack including a see-through emissive display positioned between a first optical pairing configured to collimate display light and a second optical pairing configured to counteract a focal vergence effect on the real world viewed through the compact see-through HUD.

BACKGROUND

HUDs provide significant safety and operational benefits enjoyed by operators of commercial airliners, military aircraft, regional aircraft, and business jets where HUDs are generally employed. These safety and operational benefits are also desirable in smaller aircraft.

First generation HUDs employ a relay lens assembly and combiner pair to present symbology and video to a pilot. In operation, the relay lens assembly magnifies and projects a display image to the combiner positioned in front of the pilot, for instance a fixed cockpit combiner or a helmet visor. The combiner is the final collimating element that functions to combine the display with the real world such that the displayed symbology overlays with the real world. These conventional HUDs rely on large optical components to form adequate field of view (FOV) and viewing eyebox, and therefore require specific trim panels and a unique system for each new aircraft frame. In addition, the volume of the packages including the optical components of the HUD is too large to fit within the constrained space in the cockpit of smaller aircraft. Further, conventional HUDs rely upon optical components which are generally too expensive for the cost requirements of smaller aircraft and worn displays.

Second generation HUDs employ a waveguide combiner to expand the pupil of the imaging optic. While waveguides allow for a small relay lens assembly, waveguides inherently suffer from light leakage and secondary imagery issues. In addition, waveguides are expensive to manufacture, and the manufacturing limits of glass limit the maximum size of the FOV.

Therefore, what is needed is a HUD solution that overcomes the disadvantages of the aforementioned HUD systems, and which is compatible for use with multiple aircraft and is small in size, lightweight, requires low power, and is cost-effective.

BRIEF SUMMARY

To achieve the foregoing and other advantages, in a first embodiment the present disclosure provides a compact see-through head up display (HUD) including a see-through emissive display positioned between first and second optical pairings. The see-through emissive display includes a display side (facing the user or pilot) positioned opposite a real world or environment side (facing away from the user or pilot). The see-through emissive display is configured to emit display light from at least the display side. The first optical pairing is positioned on the display side, for instance registered on the display side, and includes a first waveplate coupled with a first polarization directed lens. The first optical pairing is configured to collimate the display light by providing a first focal vergence effect (e.g., focal convergence effect) on the display light transmitted through the first optical pairing. The second optical pairing is positioned on the real world side, for instance registered on the real world side, and includes a second waveplate coupled with a second polarization directed lens. The second optical pairing is configured to provide a second focal vergence effect, equal and opposite to the first focal vergence effect of the first optical pairing, such that no perceivable focal vergence effect is provided to the real world when viewed through the HUD.

In some embodiments, the see-through emissive display, the first optical pairing, and the second optical pairing may be configured as an integrated stack. In some embodiments, the integrated stack may further include a first see-through cover plate registered on the first polarization directed lens of the first optical pairing, and a second see-through cover plate registered on the second polarization directed lens of the second optical pairing, such that see-through cover plates are provided on the terminal opposing ends of the stack.

In some embodiments, the stack may include at least two successive first optical pairings positioned on the display side of the see-through emissive display, and at least two successive second optical pairings positioned on the environment side of the see-through emissive display, wherein the stack may include an equal number of first and second optical pairings.

In some embodiments, the at least one first optical pairing may be configured to collimate the display light, and the first focal vergence effect may be a focal convergence effect.

In some embodiments, each polarization directed lens may be a thin flat window having a photo-aligned liquid crystal polymer (LCP) film deposited on one side.

In some embodiments, the see-through emissive display may be an organic light emitting display (OLED) comprising an optically see-through (e.g., transparent) anode and an optically see-through (e.g., transparent) cathode arranged to form an optical cavity therebetween, or the see-through emissive display may be a micro light emitting diode (micro-LED) display panel.

In some embodiments, the HUD may be implemented as a display in an aircraft cockpit, as a head worn display (HWD), or as a helmet mounted display (HMD).

In another aspect, the present disclosure provides an aircraft HUD including a see-through emissive display positioned between a stacked arrangement of first optical pairings positioned on the display side of the see-through emissive display configured to collimate the display light, and a stacked arrangement of second optical pairings positioned on the real world side of the see-through emissive display configured to provide a second focal vergence effect, equal and opposite to the first focal vergence effect, such that no perceivable focus change is provided to the real world when viewed through the HUD.

This brief summary is provided solely as an introduction to subject matter that is fully described in the detailed description and illustrated in the drawings. This brief summary should not be considered to describe essential features nor be used to determine the scope of the claims. Moreover, it is to be understood that both the foregoing summary and the following detailed description are exemplary and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1:
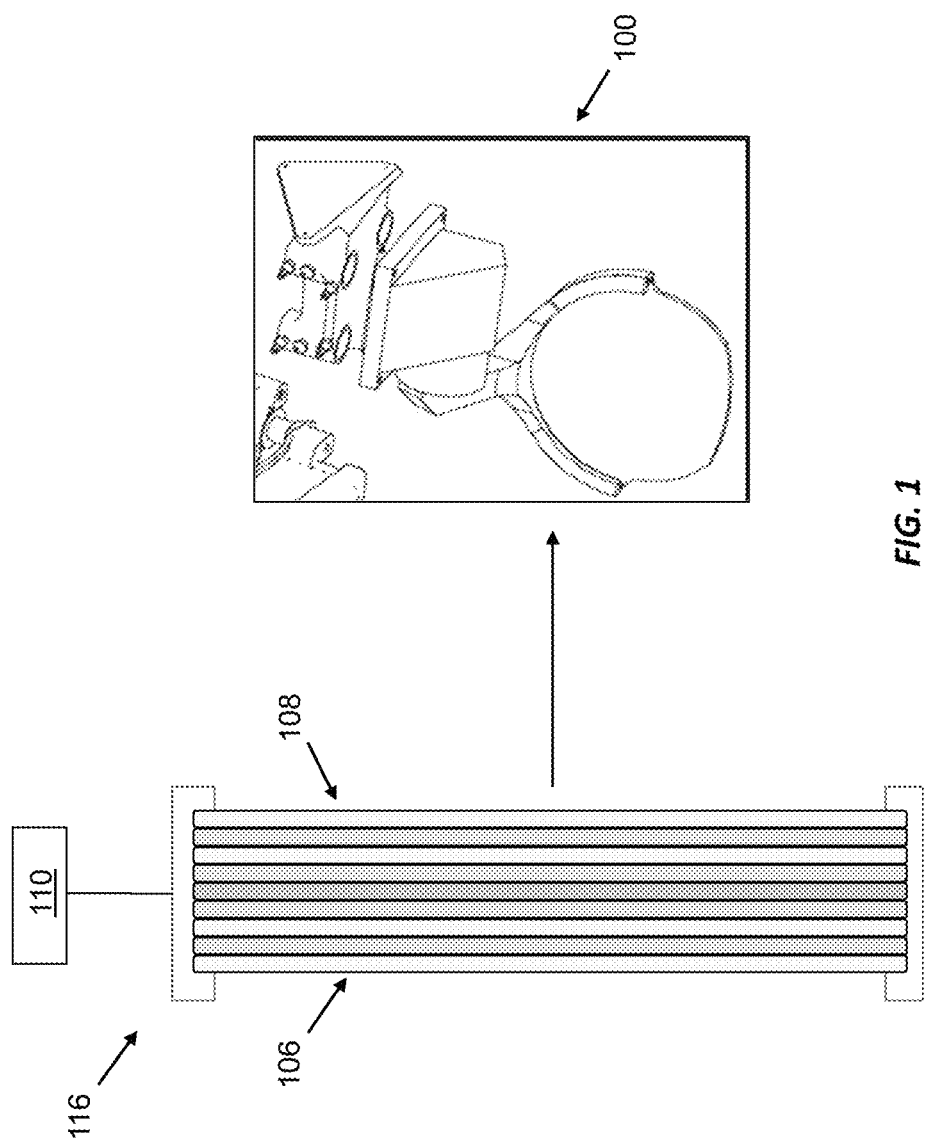
FIG. 1 is a schematic diagram of an aircraft cockpit HUD system in accordance with an exemplary embodiment of the present disclosure.

Before explaining one or more embodiments of the disclosure in detail, it is to be understood that the embodiments are not limited in their application to the details of construction and the arrangement of the components set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1*a*, 1*b*). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Broadly speaking, the present disclosure describes head up display (HUD) assemblies and systems for use in vehicles such as aircraft for overlaying one or more of symbology, graphics and video over the real world (e.g., environment) as viewed through the HUD.

With reference to FIG. 1, a HUD system according to the present disclosure is indicated at reference numeral 100. The HUD system 100 can be utilized in various applications including, but not limited to, aviation, naval, medical, targeting, ground based, military, and space. As used herein, the term HUD refers to implementations including, but not limited to, a fixed HUD, a near eye display, a head worn display (HWD), a helmet mounted display (HMD), or any type of display which employs a combiner for overlaying images over a real world scene. As used herein, the term real world refers to the outside environment, environment imagery, or any other image real or virtual viewable through the HUD.

In some embodiments, the HUD system 100 may be configured for use in smaller cockpit environments and in worn display applications and yet provides an appropriate field of view and eye box for avionic applications. In some embodiments, the HUD system 100 achieves a wide field of view (FOV), for instance greater than 40 degrees. The HUD system 100 can be configured for use with worn components including, but not limited to, glasses, goggles, hats, helmets, etc., or implemented as a HUD system with a fixed combiner. The HUD system 100 can be implemented in a variety of sizes and display areas. For example, a worn version of the HUD system 100 may have a display area of 40 centimeter squared or less, and a fixed version of the HUD system 100 may have a display area of more than 40 centimeters squared.

Figure 2:
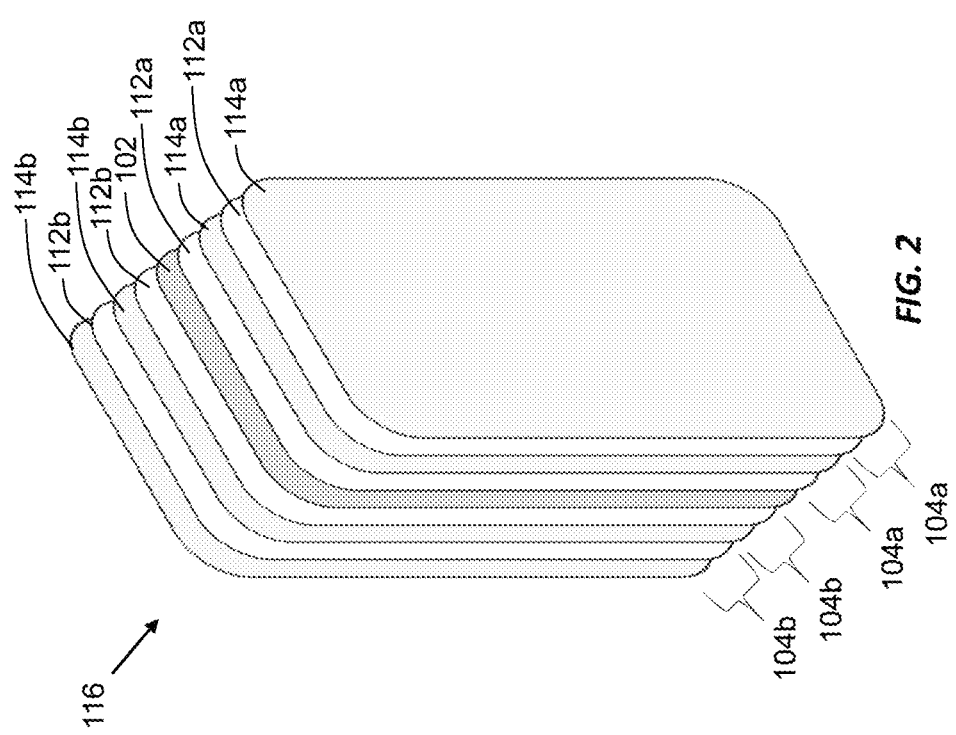
FIG. 2 is a schematic diagram of an integrated HUD assembly in accordance with an exemplary embodiment of the present disclosure.

With reference to FIGS. 1 and 2, the HUD system 100 generally includes a see-through emissive display 102 positioned between at least one first optical pairing 104*a* and at least one second optical pairing 104*b*. As used herein, the term "see-through" refers to fully or highly optically transparent, transmissive or translucent, such that real world images can be seen when viewed through at least a portion of the HUD. The see-through emissive display 102, which may be implemented as a see-through organic light emitting diode (see-through OLED), micro-LED, etc. as discussed further below, includes a display side 106 positionable facing the user/pilot, and an environment side 108 positioned opposite the display side, 106 and positionable, facing the real world. The see-through emissive display 102 is configured to display light emitted by the see-through emissive display 102 forming symbology, graphics, video etc. Display light emitted from the display side 106 toward the pilot is subjected to a focal vergence effect as the display light is transmitted through the at least one first optical pairing 104*a*, as discussed further below. The see-through emissive display 102 is communicatively and electrically coupled to a controller 110 configured to generate content to be displayed on the see-through emissive display 102.

Each first optical pairing 104*a* generally includes a waveplate 112*a* coupled with a polarization directed lens 114*a*. In some embodiments, the polarization directed lens 114a is registered on the waveplate 112a to form a first Integrated optical pairing 104a, which in turn is registered on the display side 106 of the see-through emissive display 102 to form a portion of an integrated HUD assembly 116. In some embodiments, the HUD assembly 116 includes two or more successive first optical pairings 104a configured as a stack, with each first optical pairing 104a including a waveplate 112a coupled with a polarization directed lens 114a for providing a focal vergence effect on the display light transmitted therethrough.

Each second optical pairing 104b also generally includes a waveplate 112b coupled with a polarization directed lens 114b. In some embodiments, the polarization directed lens 114b is registered on the waveplate 112b to form a second integrated optical pairing 104b, which in turn is registered on the environment side 108 of the see-through emissive display 102 to form a portion of the integrated HUD assembly 116. In some embodiments, the HUD assembly 116 includes two or more successive second optical pairings 104b, positioned in facing relation and configured as a stack, with each second optical pairing 104b including a waveplate 112b coupled with a polarization directed lens 114b for providing a focal vergence effect on the display light transmitted therethrough. As such, for each of the at least one first and second optical pairing 104a, 104, from the see-through emissive display 102 'outward' waveplates 112a, 112b and polarization directed lenses 114a, 114b are positioned in alternating fashion.

In some embodiments, the HUD assembly 116 is configured as an integrated stack symmetrical about the see-through emissive display 102, such that an equal number of first and second optical pairings 104a, 104b are positioned on opposing sides of the see-through emissive display 102 (i.e., equal and opposite pairing). In some embodiments, the first optical pairing 104a and the second optical pairing 104b positioned closest the see-through emissive display 102, for instance registered on theft respective display and environment sides, may be the same such that a second focal vergence effect provided by the second optical pairing 104b counteracts the first focal vergence effect provided by the first optical pairing 104, at least with respect to the real world as viewed through the HUD assembly 116, as discussed further below. In some embodiments, each successive 'outward' positioned second optical pairing 104b is provided to counteract each successive 'outward' positioned first optical pairing 104a. As such, in some embodiments, the HUD assembly 116 may include an equal number of corresponding first and second optical pairings 104a, 104b.

In some embodiments, the HUD assembly 116 may include a greater or lesser number of second optical pairings 104a as compared to the number of first optical pairings 104a. For example, the counteracting effect of the second optical pairings 104b on the real world as viewed through the display, as discussed further below, may be achieved using a greater or lesser number of second optical pairings 104b as compared to the number of first optical pairings 104a, For example, a focal vergence effect provided by one first optical pairing 104a positioned on the display side 106 of the see-through emissive display 102 may be counteracted using two more second optical pairings 104b positioned on the environment side 108, or vice versa. As such, the number and configuration of first and second optical pairings 104a, 104b is customizable.

In some embodiments, the number of required first and second optical pairings 104a. 104h and their respective configuration may be dependent on the type and/or complexity of the display image(s), for example, color, graphics, video, etc. For example, a single first and second optical pairing may be sufficient to achieve the desired focal vergence effect for 'simple' symbology, whereas two or more first and second optical pairings 104a, 104b may be necessary to provide the desired vergence effect for 'complex' display images, colors, improved aberration control, focus correction, distortion, and other higher-order optical corrections.

Figure 3:
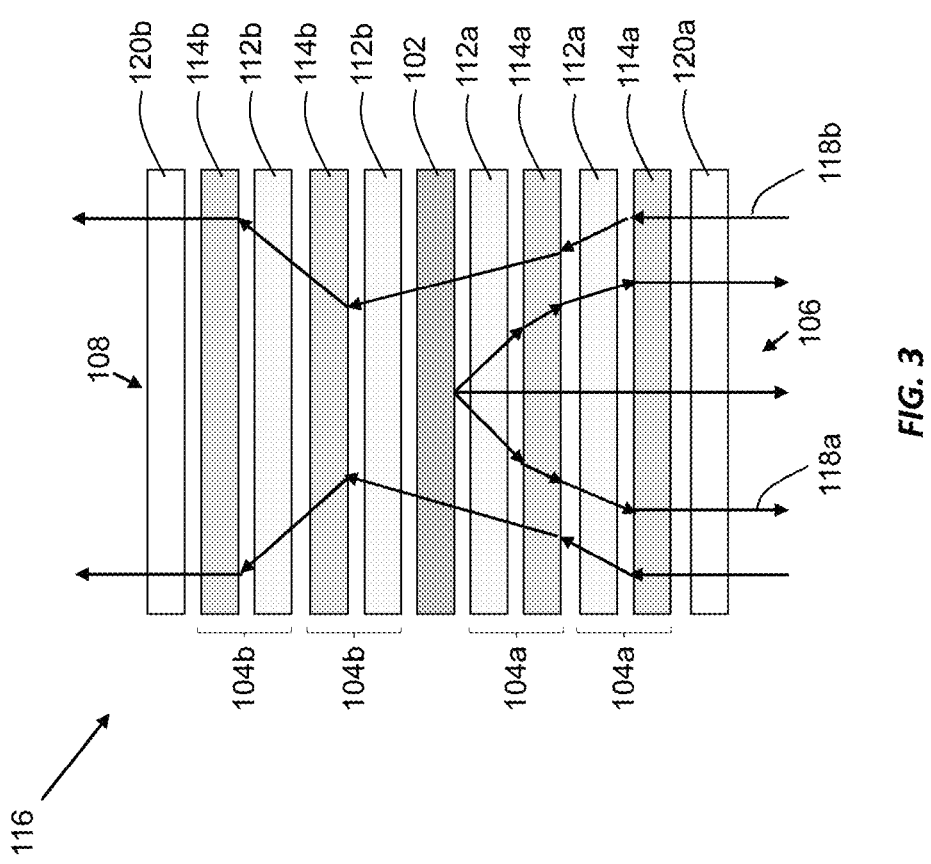
FIG. 3 is a schematic diagram illustrating the focal vergence effect in the HUD assembly in accordance with an exemplary embodiment of the present disclosure.

With reference to FIG. 3, the at least one first optical pairing 104a provides a first focal vergence effect on each of the display path 118a and the real world image path 118b, and the second optical pairing 104b functions to provide a second focal vergence effect, different from the first focal vergence effect, on the real world image path 118b. In some embodiments, the at least one first optical pairing 104a alters the focal vergence of the display light and the real world as viewed through the see-through emissive display, and the at least one second optical pairing 104b alters the focal vergence of the real world as viewed through the see-through emissive display 102. In some embodiments, the second focal vergence effect provided by the at least one second optical pairing 104b counteracts the first focal vergence effect provided by the first optical pairing 104a. As used herein, the term counteracts may refer to correction, cancelation, neutralization, etc.

Figure 4:
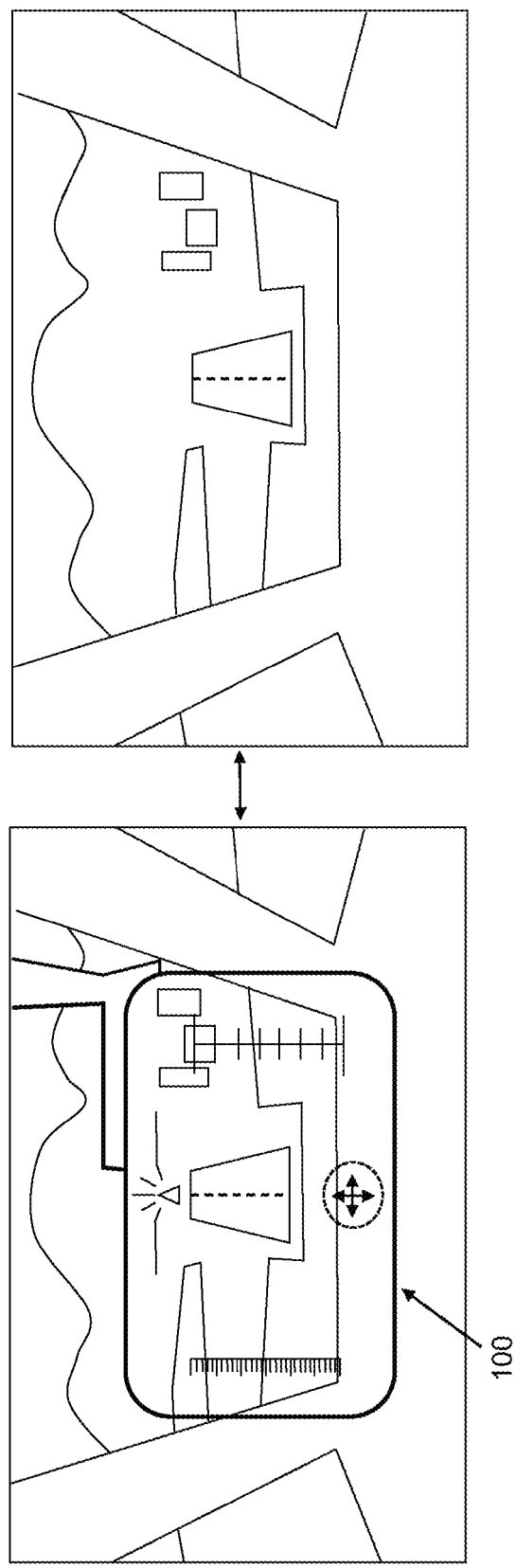
FIG. 4 is a schematic diagram illustrating focal vergence effect counteraction of the real world as viewed through the HUD assembly in accordance with an exemplary embodiment of the present invention.

In some embodiments, the second focal vergence effect may be substantially equal and opposite to the first focal vergence effect. As such, in regards to the real world as viewed through the see-through emissive display 102, the focal distance change imparted on the real world image by the at least one first optical pairing 104a is counteracted by the focal distance change imparted on the real word image by the at least one second optical pairing 104b, or vice versa. Therefore, with reference to FIG. 4, the real world appears the same whether viewed through the see-through HUD assembly 116 (left image in FIG. 4) or outside of the see-through HUD assembly 116 (right image in FIG. 4). In other words, from the pilot's view, the real world would be focused by the same optical power as the display path. Thus, the pilot's eyes do not have to refocus when viewing through or outside the HUD assembly 116, which is important for safety and time-critical maneuvers.

In some embodiments, the at least one first optical pairing 104a may function to collimate the display light, and the first focal vergence effect of each first optical pairing 104a may be a focal convergence effect. Collimation results in the display light rays being made parallel to the lens of the eye so that the display image is perceived to be at or near infinity such that the display image can be overlaid over the real world image. In an embodiment including a single first optical pairing 104a, diverging display light rays transmitted through the single first optical pairing 104a may be made parallel. In embodiments including at least two first optical pairings 104a, the 'first' first optical pairing 104a encountered by the display light rays provides a convergence effect to partly converge the display light rays toward parallel, and the 'second' and successive first optical pairings 104a encountered by the partially converged display light rays continue to converge the display light rays until the display light rays are parallel as they exit the HUD assembly 116.

With continued reference to FIG. 3, the HUD assembly 116 may further include a first optically see-through cover plate 120a positioned at the terminal end of the at least one first optical pairing 104a, and a second optically see-through cover plate 120b positioned at the terminal end of the at least one second optical pairing 104b. Each optically see-through cover plate 120a, 120b may be registered on its respective 'outward most' polarization directed lens 114a, 114b.

In some embodiments, each waveplate 112a, 112b, also known as a retarder, may be a flat optical component configured to transmits light and modify its polarizations state without attenuating, deviating or displacing the beam. In some embodiments, each polarization directed lens 114a, 114b may be a thin (e.g., 0.45 mm) flat window having a photo-aligned liquid crystal polymer (LCP) film deposited on one surface. In some embodiments, each polarization directed lens 114a, 114b may be sensitive to circular polarization such that, when the LCP coated surface is positioned facing the light source, left-hand circular polarization (LHCP) light will focus with the stated positive focal length of the lens, and right-hand circular polarization (RHCP) light will diverge with the negative stated focal length of the lens.

Figure 5:
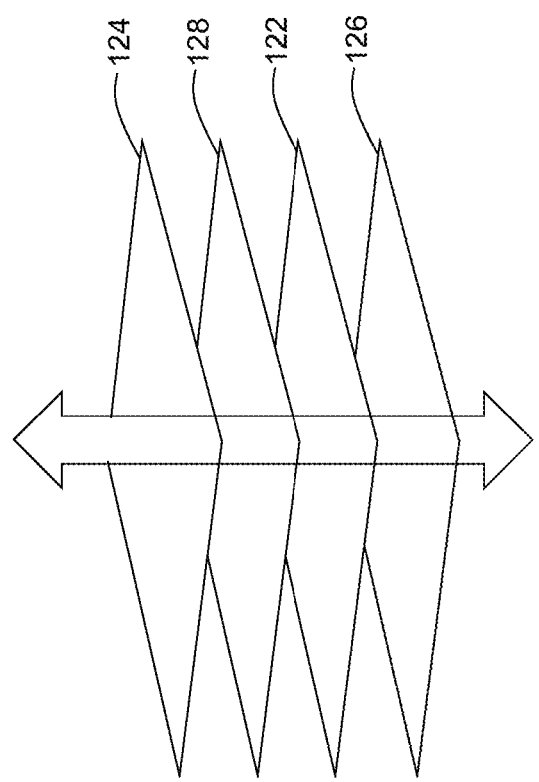
FIG. 5 is a schematic diagram of a see-through emissive display in accordance with an exemplary embodiment of the present disclosure.

With reference to FIG. 5, non-limiting examples of see-through emissive displays 102 include see-through OLEDs and micro-LEDs. In some embodiments, the see-through OLED may include an optically see-through anode 122, optically see-through cathode 124, optically see-through substrate 126, and optically see-through organic layer 128 arranged in a stack such that generated light can be directed through one or both sides of the device, and when the device is inactive the device is see-through. Micro-LEDs can include a see-through polyimide substrate, among other see-through materials.

Figure 6:
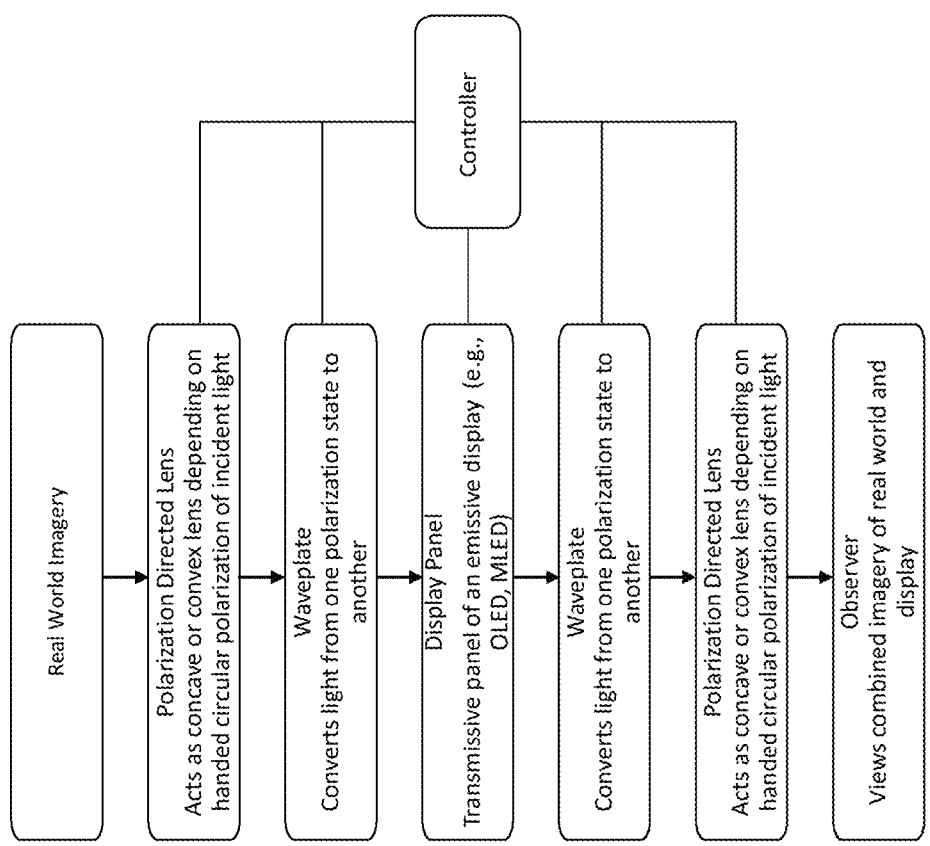
FIG. 6 is a block diagram of a HUD system in accordance with an exemplary embodiment of the present disclosure.

With reference to FIG. 6, in operation, the controller 110 generates images to be displayed by the see-through emissive display 102 to a pilot or other operator so that the pilot or other operator simultaneously views the display images and the real world through the HUD assembly 116. The images can include graphic and/or text information (e.g., flight path vector) related to avionic information in some embodiments. In addition, the images can include synthetic or enhanced vision images. In some embodiments, the images can include video.

In some embodiments, the controller 110 may be coupled to the optical pairings such that certain ones of the optical pairings can be electrically activated or deactivated to change the focal plane of the display image. For example, in some embodiments, the controller 110 may be operable to provide an electrical signal to the waveplates to change the polarization of the incident light (either from the emissive display or the real world), for example, in HWD and HMD embodiments to change a real world scene from infinity to, for example, less than infinity, for instance 1 meter. The display side can also be controlled to match the changing scene so there is no parallax (or vergence effect).

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed is:

1. A head up display, comprising:
   a see-through emissive display comprising a display side and an environment side positioned opposite the display side, the see-through emissive display configured to emit display light on at least the display side;
   a first stacked configuration of two or more first optical pairings positioned on the display side of the see-through emissive display, each first optical pairing comprising a first waveplate coupled with a first polarization directed lens, the first stacked configuration of two or more first optical pairings configured to collectively provide a first focal vergence effect on the display light transmitted through the first stacked configuration of two or more first optical pairings; and
   a second stacked configuration of two or more second optical pairings positioned on the environment side of the see-through emissive display, each second optical pairing comprising a second waveplate coupled with a second polarization directed lens, the second stacked configuration of two or more second optical pairings configured to collectively provide a second focal vergence effect, equal and opposite to the first focal vergence effect, such that no perceivable focal vergence effect is provided to outside environment viewed through the head up display;
   wherein:
   each of the two or more first optical pairings is configured to partly converge the display light toward parallel according to a first focal vergence sequence of the first stacked configuration;
   each of the two or more second optical pairings is configured to partly counteract the focal vergence effect according to a second focal vergence sequence of the second stacked configuration; and
   a number of the second optical pairings is unequal to a number of the first optical pairings.

2. The head up display according to claim 1, further comprising a first see-through cover plate registered on the first stacked configuration of first optical pairings, and a second see-through cover plate registered on the second stacked configuration of second optical pairings.

3. The head up display according to claim 1, wherein the first waveplate is positioned between the see-through emissive display and the first polarization directed lens, and the second waveplate is positioned between the see-through emissive display and the second polarization directed lens.

4. The head up display according to claim 1, wherein the first polarization directed lens is flat and has a photo-aligned liquid crystal polymer (LCP) film deposited on one side.

5. The head up display according to claim 1, wherein the see-through emissive display is an organic light emitting display (OLED) comprising an optically see-through anode and an optically see-through cathode arranged to form an optical cavity therebetween, and wherein the display light is emitted through the optically see-through cathode in a direction away from the optically see-through anode.

6. The head up display according to claim 1, wherein the see-through emissive display is a micro light emitting diode (micro-LED) display panel.

7. The head up display according to claim 1, implemented as one of a fixed display in an aircraft, a head worn display, and a helmet mounted display.

8. An aircraft head up display, comprising:
   a see-through emissive display comprising a display side and an environment side positioned opposite the display side, the see-through emissive display configured to emit display light on at least the display side;
   a stacked arrangement of two or more first optical pairings positioned on the display side of the see-through emissive display configured to collimate the display light, each of the first optical pairings comprising a first waveplate coupled with a first polarization directed lens, and the stacked arrangement of two or more first optical pairings configured to collectively provide a first focal vergence effect on the display light transmitted therethrough; and a stacked arrangement of two or more second optical pairings positioned on the environment side of the see-through emissive display, each of the second optical pairings comprising a second waveplate coupled with a second polarization directed lens, and the stacked arrangement of two or more second optical pairings configured to provide a second focal vergence effect, equal and opposite to the first focal vergence effect, such that no perceivable focal vergence effect is provided to an outside environment viewed through the aircraft head up display;

wherein:

each of the two or more first optical pairings is configured to partly converge the display light toward parallel according to a first focal vergence sequence of the stacked arrangement of the two or more first optical pairings;

each of the two or more second optical pairings is configured to partly counteract the focal vergence effect according to a second focal vergence sequence of the stacked arrangement of the two or more second optical pairings; and a number of the second optical pairings is unequal to a number of the first optical pairings.

9. The aircraft head up display according to claim 8, further comprising a first see-through cover plate registered on the stacked arrangement of first optical pairings, and a second see-through cover plate registered on the stacked arrangement of second optical pairings, wherein the first see-through cover plate, the stacked arrangement of first optical pairings, the see-through emissive display, the stacked arrangement of second optical pairings, and the second see-through cover plate are configured as an integrated stack.

10. The aircraft head up display according to claim 8, wherein the see-through emissive display is an organic light emitting display (OLED) comprising an optically see-through anode and an optically see-through cathode arranged to form an optical cavity therebetween, and wherein the display light is emitted through the optically see-through cathode in a direction away from the optically see-through anode.

11. The aircraft head up display according to claim 8, wherein the see-through emissive display is a micro light emitting diode (micro-LED) display panel.

12. The aircraft head up display according to claim 8, implemented as one of a fixed display, a head worn display, and a helmet mounted display.

* * * * *